Jan. 21, 1947.    A. CROT    2,414,509
BULKHEAD MOUNTING FOR CONDUITS
Filed June 2, 1944
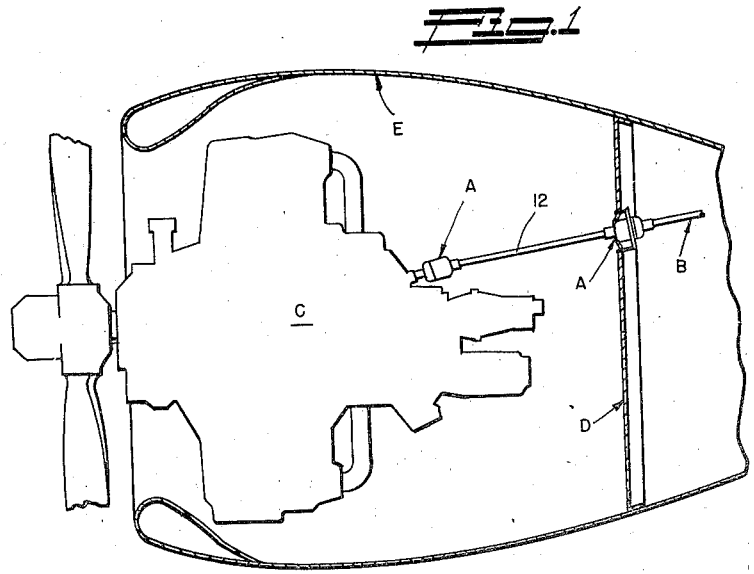
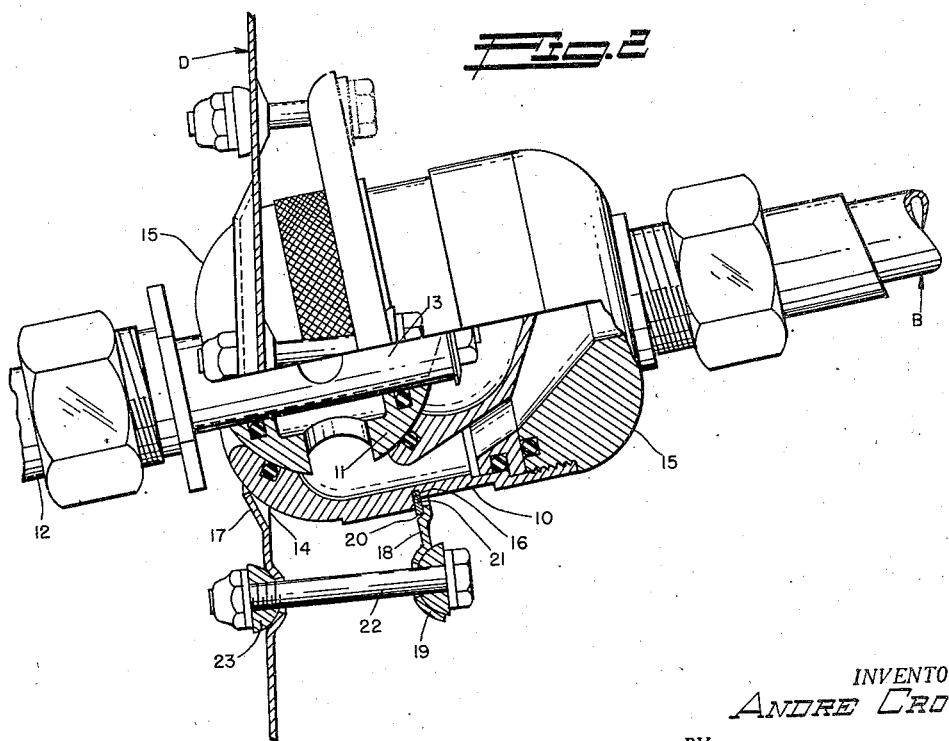
INVENTOR.
ANDRE CROT
BY
George Sullivan
AGENT Patented Jan. 21, 1947

2,414,509

UNITED STATES PATENT OFFICE 2,414,509

BULKHEAD MOUNTING FOR CONDUITS

Andre Crot, Topanga, Calif., assignor to Lockheed Aircraft Corporation, Burbank, Calif.

Application June 2, 1944, Serial No. 538,443

3 Claims. (Cl. 248—56)

This invention relates to an improved and simplified angularly adjustable mounting for supporting fluid line couplings which extend through bulkheads, firewalls, and the like, and as more particularly shown herein relates to supporting the universal and slip joint of my prior application, Serial No. 501,354, in such bulkheads or firewalls of airplane engine mountings, where the engine is flexibly mounted and subject to continuing movements and vibrations which must be absorbed or suppressed in numerous fluid and hydraulic connections to such engines.

It has heretofore been the practice to use hose connections between the engine and the firewall, and the substitution of my aforementioned universal and slip joints for such hose connections introduces a mounting problem therefor at the firewall. If such slip joints are merely substituted for the prior hose lines, retention of the bulkhead couplings or mountings necessary for the hoses would add unnecessary weight to the combination, since the joint itself, when mounted as disclosed herein, can also replace the conventional couplings heretofore used with the hose connections. To appreciate the extent of the problem involved, it may be stated that a recent airplane has 129 hose connections in the four engine nacelles, for various vacuum, fluid and hydraulic connections to the power plant.

It is accordingly an object of this invention to provide an improved and simplified bulkhead mounting for fluid connections of the type described wherein the connection itself may serve as the usual disconnectable coupling used in such locations.

It is also an object of this invention to provide an improved and simplified bulkhead or firewall connection or coupling which can be angularly adjusted relative to the firewall to increase the overall angular adjustments in the universal slip joint. Such an arrangement facilitates the disposition of a number of such joints around the periphery of the bulkhead or firewall, leaving the central area thereof free for access to the rear of the power plant. With such an arrangement a central access door may be provided in the case of a firewall, or a bulkhead may take the form of a ring.

Other objects and features of the invention will be readily understood from the following detailed description of typical preferred forms of the invention throughout which reference will be made to the accompanying drawing in which:

Figure 1 is a schematic showing of an aircraft power plant having a fluid connection therefrom extending through a firewall or bulkhead back of the power plant, one end of the fluid connection being mounted in the firewall or bulkhead in accordance with the teachings of this invention.

Figure 2 is an enlarged fragmentary detail partly in section showing the firewall mounting of the connection.

As shown—

The embodiment of my invention chosen for illustrative purposes is shown in connection with a universal slip joint generally designated by the reference character A, which joint is used to form a fluid conduit B from a power plant C through a firewall D in back thereof, the power plant C being shown as enclosed in an engine nacelle or cowling E. It will be understood that the chosen illustration is not intended to limit the use of my invention to such an installation, since it is equally suitable for adjustably mounting conduits, couplings, and the like, in bulkheads or partitions in other fields.

The particular fluid conduit B chosen for illustrative purposes comprises a universal and slip joint connection more particularly described in my prior application, Serial No. 501,354 filed September 6, 1943, wherein two socket members 10 contain balls 11 connected together by a tube 12 having end members 13 slidable in the balls 11. The details of this connection have no particular bearing on the present invention, which relates to adjustably mounting one of the socket members 10 in a suitable aperture 14 in the firewall D. For this purpose the two piece socket member 10 is formed with spherical ends 15 and a snap ring groove 16 is turned therein intermediate the ends. One or the other spherical end 15 is seated in the aperture 14 in the firewall, which preferably is dimpled as indicated at 17, in the case of a thin sheet metal structure, in order to stiffen the bulkhead or firewall adjacent the hole therein.

An annular plate 18 is preferably formed with a peripheral bead 19, and an internal shoulder 20, the latter serving to hold a snap ring 21 seated in the groove 16 in the member 10; and being mountable thereover from either end of the member 10 by reversing the plate 18. The plate 18 is used to press or clamp the member 10 into the aperture 14 at angularly adjustable positions relative thereto, being held in adjusted position by three or more bolts 22 having spherical washers 23. In the drawing, four bolts are shown as providing for easier angular adjustment of the member 10, since oppositely disposed bolts can be relatively adjusted to change the angular position of the member in the plane passing therethrough.

The angular adjustment provided by the plate 18 and bolts 22 supplements or permits centering of the limited angular adjustment in the universal joint itself, and thereby enables location of several such fluid connections around the periphery of a firewall or bulkhead, instead of grouping such connections in the center thereof. When such connections are used to carry fluids to a flexibly mounted engine, the range of vibratory and torque movements of the engine require that sufficient angular freedom be retained in the joints themselves so that only a portion of the angular range of the joints can be used to provide flexibility in the layout of the connections.

It will be evident from the foregoing that the plate 18 can be reversed on the snap ring 21 and the socket member seated from the opposite side of the bulkhead or firewall, the dimpling, if any, in the firewall having been struck from the opposite side thereof. Thus if Figure 2 be considered a right hand assembly, the socket member 10 would project to the left in the case of a left hand assembly, the choice being dictated by the designer's desires as to which side of the firewall the socket member should be disposed on.

Having described only a typical form of the invention, I do not wish to be limited to the specific details herein set forth, but wish to reserve to myself any variations or modifications that may appear to those skilled in the art or fall within the scope of the following claims.

I claim as my invention:

1. In combination with a housing member having at least one spherical end adapted to seat in an aperture in a bulkhead, a clamping element encircling and engaging said housing member, the housing member and the clamping element being universally adjustable relative to the bulkhead, and means for holding the housing member and the clamping element in their adjusted position.

2. An adjustable bulkhead mounting for use with a housing member having a peripheral groove intermediate its length and a spherical end adapted to seat in an aperture in said bulkhead which includes a snap ring seated in said groove, a clamping plate arranged to engage said snap ring when placed over said housing member from either end thereof, the housing member and the clamping plate being universally adjustable relative to the bulkhead, and means for holding the housing member and the clamping plate in their adjusted position.

3. In combination with a double universal fluid connection having at least one joint member adapted to be mounted in an aperture in a bulkhead or firewall, a clamping ring engageable with said joint member and adapted to force the joint member against the periphery of the bulkhead aperture, and clamping means adjustably connecting the clamping ring and bulkhead whereby the angular position of the joint member relative to the bulkhead may be varied.

ANDRE CROT.